Patented Mar. 7, 1944

2,343,851

UNITED STATES PATENT OFFICE 2,343,851

CATALYTIC CONVERSION OF HYDROCARBONS

Aristid V. Grosse and Jacque C. Morrell, Chicago, Ill., assignors to Universal Oil Products Company, Chicago, Ill., a corporation of Delaware No Drawing. Application November 29, 1939, Serial No. 306,679

8 Claims. (Cl. 260—673.5)

The present invention relates particularly to a process for the conversion of hydrocarbons such as the heavier distillate fractions of petroleum generally in the presence of composite catalysts to produce substantial yields of gasoline boiling range fractions containing increased proportions of cyclic hydrocarbons. The process is also applicable to conversion involving single hydrocarbons, synthetically produced hydrocarbon mixtures or primary distillates produced in the destructive distillation of hydrocarbonaceous materials such as coals, lignites and shales.

One of the prime objects of this invention is to process hydrocarbons in the presence of mixed catalysts having active principles favoring not only cracking or splitting reactions of the carbon to carbon bonds but also favoring dehydrogenation and cyclization of hydrocarbon chains thereby increasing the proportion of desirable aromatic hydrocarbons in the low boiling fractions formed. The catalytically controlled reactions involve primary and concurrent secondary reactions but the secondary reactions are not for the greater part of a destructive character and do not form polymers nearly as extensively as in pyrolytic cracking. The formation of branched chain and cyclic hydrocarbons is increased by the present process and the minor proportions of carbonaceous residue formed on the catalysts are removable by oxidation. The yield varies depending upon the boiling point range and the hydrocarbon character of the charging stock, and the components and mode of preparation of the catalyst. The composite catalysts which are selective in promoting the desired reactions are characterized by their ease of regeneration and their refractory condition which enables them to maintain their high degree of activity over extended periods of time under the high temperature conditions of use and regeneration.

In one specific embodiment, the present invention comprises a process for converting higher boiling fractions vaporizable without substantial decomposition into low-boiling hydrocarbon fractions containing increased proportions of cyclic hydrocarbons which consists in contacting said higher boiling fractions at elevated temperature with catalysts composited from refractory silica-alumina catalytic masses together with supported oxides of the elements in the left-hand columns of group V of the periodic table comprising vanadium, tantalum and columbium.

The present process depends primarily upon the fact that conversion reactions involving long chained hydrocarbons present more or less in most petroleum charging stocks as well as hydrocarbons containing aromatic or naphthenic nuclei with long side chains, are effected causing the cleavage of carbon to carbon bonds and partial dehydrogenation of carbon to hydrogen bonds with more or less formation of aromatic compounds in the low boiling product by cyclization reactions. Cyclic saturated compounds present, such as cycloparaffins, are dehydrogenated to further increase the overall yield of aromatic compounds thereby also increasing the desirable qualities of the product such as antiknock value. As a result of these reactions there is an increase of components such as benzene, toluene, and xylene in the gasoline product and increased proportions of hydrogen in the by-product gases. Obviously the complete attainment of these reactions is not possible in practice nor are all compounds of the exact nature typified by the aromatic compounds named, but many related compounds exist in the distillate fractions produced. In general, the cyclization principle effects not only the cyclization reactions of chains resulting from hydrocarbon decomposition but also brings about dehydrogenation of naphthenic rings to produce desirable aromatic components.

The components in the composite catalysts of the present invention effecting the splitting reactions may comprise, for example, artificially produced and promoted silicates such as silica-alumina complexes or natural silica combinations such as bentonites and montmorillonites, either raw or acid treated, permutites and other active materials such as certain phosphates of aluminum, zirconium, and titanium. These catalytically active materials may have their refractory condition enhanced by the inclusion of so-called supports which in themselves very frequently have little or no catalytic influence. Diatomaceous earth, kieselguhr, numerous other clays and earths, crushed silica, crushed firebrick and glauconite (greensand) may be used as supporting materials.

The more prominent materials functioning as cracking catalysts are acid-treated montmorillonite clays or synthetically prepared silica or silica-alumina composites. These materials may contain various proportions of silica and alumina by analysis, the amount of each component being varied in the chemical treatment or preparation and additional oxides being frequently added in small amounts to improve the structural properties of the catalyst or to maintain the active structure of the catalyst under the prolonged conditions of high temperature required in commercial practice.

One preferred method of preparing the cracking component incorporated into the composite catalyst of the present invention is to admix precipitated silica gel and precipitated alumina under conditions whereby the final catalytic material will be substantially free from reacting materials introduced in the process of preparation. The silica gel may be precipitated from an aqueous solution of sodium silicate by the addition of an acid, such as hydrochloric acid for example. The excess acid and the concentration of the solution in which the precipitation is finally brought about determine the suitability of the silica hydrogel for subsequent compositing with precipitated alumina. The alumina may be precipitated in the presence of the washed or purified silica gel by suspending the silica gel in an aqueous solution of aluminum salt and precipitating alumina by the addition of an alkaline medium such as ammonium hydroxide. Alternatively, the silica gel and alumina may be co-precipitated from a solution of water glass to which soluble compounds of aluminum are added together with suitable precipitating agents. In any event the silica gel and precipitated alumina are very intimately associated in the resulting silica-alumina complex. Whatever the form or type of cracking principle used and whether more or less inert supports are added or not, the cracking portion of the catalyst is very intimately mixed with the remaining principle incorporated into the composite catalyst as subsequently described.

The components or principles entering into the composite catalyst of the present invention which are effective in facilitating the cyclization and dehydrogenation reactions may be of a supported character. Various materials having the necessary physical and chemical characteristics for supports are available. There are three hydrated oxides of aluminum occurring in nature, hydrargillite and gibbsite having the formula $Al_2O_3.3H_2O$, bauxite having the formula $$Al_2O_3.2H_2O$$

and diaspore having the formula $Al_2O_3.H_2O$. Of these three minerals, only the oxide produced from the bauxite and gibbsite are suitable for the manufacture of the present type of catalyst and this material has given good results. Suitable forms of alumina may be made by calcining trihydrates if they are in the proper crystalline form, the suitability and activity of the calcined oxides depending upon the care observed in preserving their porous structure. Precipitated trihydroxide may likewise be employed as the catalyst carrier when observing similar precautions. In the final steps of preparing aluminum oxide as a base material it is best practice to ignite or calcine it at temperatures within the approximate range of 1100–1600° F. This does not correspond to complete dehydration of the hydrated oxides but yields a catalytic material of good strength and porosity so as to resist for a long period of time the deteriorating effects of the high temperatures used in the contact and regeneration periods. Aside from alumina prepared in this manner, magnesium oxide prepared by calcining the mineral magnesite at temperatures of the order of 1450–1650° F. has been used as a base material in some cases with good results.

In general, it has been found that the preferred oxides should be deposited in relatively minor amounts upon the base material or carrier, usually in amounts of the order of less than 20 percent by weight of the base material. The more common practice is to utilize 2–10 percent by weight of these oxides and they are preferably produced in situ from precipitated hydroxides or by the partial reduction of higher oxides remaining as a residue after the ignition of adsorbed salts containing a volatile acid radical. These oxides or promoters so-called, essential in the cyclization principle are deposited upon the base material and include generally compounds but more usually the oxides of the elements in the left-hand column of group V of the periodic table including vanadium, tantalum and columbium. Many of the compounds of the preferred elements are useful in producing catalytically active material but the oxides, and more particularly the lower oxides, seem to result in the best catalyst. The promoting materials may for example be deposited and produced in situ by absorption of soluble compounds of the elements in question upon the base material, removal of the solvent and decomposition of the soluble compound. In some cases, however, it is more desirable to very intimately admix or deposit insoluble compounds with the carrier more generally while in the wet condition.

Solutions of ammonium and alkali metal vanadates may be employed in impregnating carriers with oxides of vanadium, also soluble vanadyl sulfates and vanadium nitrate and carbonate. In the case of columbium it appears that the lower oxides such as $CbO_2$, $Cb_2O_3$ and $CbO$ may constitute the more active oxides. These may finally be formed in the catalytic material produced by precipitating the hydroxide of columbium upon the supporting material. With tantalum the hydroxide may be precipitated from solutions of various soluble salts, as for example, from the solution of the double fluoride by the use of alkaline precipitants such as ammonium hydroxide or ammonium carbonate, for example, the hydrate deposited on the carrier being later ignited to form the oxide. The pentoxide $Ta_2O_5$, the tetraoxide $Ta_2O_4$ and possibly the sesquioxide $Ta_2O_3$ may constitute the promoting agency in these reactions.

Generally, in the preparation of the composite catalysts of the present invention, the cracking components on the one hand and the cyclization components on the other hand, are separately prepared and may be admixed in the wet or dry condition and formed into particles or pellets for contacting with the hydrocarbons. It appears preferable to intimately admix these materials while in the wet condition preliminary to drying and forming of the contact masses. Although useful results may be achieved using rather wide ratios of the functioning components, best results appear to be obtained when using minor proportions of the dehydrogenation and cyclization component and major proportions of the cracking components, for example 10 to 40 parts of the former and 100 parts of the latter. After said components have been intimately mixed, as for example by slurrying a freshly prepared precipitated silica-alumina in admixture with the wet material consisting of vanadium oxide disposed on an alumina support, this preparation may be freed from excess water and extruded directly or dried and formed into shaped particles. Frequently it is more economic practice to wash the aggregate after it had been dried with suitable washes since the impurities may be intimately associated with the gel or particle structure and therefore very difficult to remove by washing treatments. Subsequently the material is heated at high temperatures, more usually after the catalytic masses are formed into particles, whereby the catalyst assumes the active form necessary for prolonged use in the desired hydrocarbon reactions. This temperature is of the order of 1000–1500° F., more or less, a temperature such as 1400° F. for example being desirable. Despite these high temperatures of heating, small proportions of water of the order of 2–5% appear to be associated with the catalytic material.

Catalysts prepared in general accordance with the procedures above outlined apparently possess a large total contact surface corresponding to a desirable porosity, the pores of the catalyst particles being of suitable size and shape so as not to become permanently clogged with carbonaceous deposits when in continued service. The catalysts are therefore not difficult to reactivate by oxidation and they retain their high degree of activity after the high temperature conditions of alternate use and reactivation for long periods of time.

In common with many other catalytic processes, the composite catalyst of this invention may be conveniently utilized in carrying out the desired reactions when employed as filling material in tubes or chambers in the form of small pellets or granules. The average particle size may vary within the approximate range of 2 or 3 to 10 mesh which may apply to either pellets of uniform size, short cylindrical shapes or to particles of irregular size and shape produced by consolidating and sizing of the powdered catalytic material. While the simple method of preheating a given fraction of hydrocarbon oil to be processed at a temperature suitable for conversion in contact with the catalyst and then passing the vapors over a stationary mass of the catalyst particles may be employed in some cases, it is generally more preferable to pass the preheated vapors through beds of catalyst where the passage of vapors is restricted to definite paths rather than unrestricted contact to large beds of catalytic material. It is thus possible to more accurately control the temperature of the catalyst in use and during regeneration by various heat interchange devices and mediums. After the passage of oil vapors over the catalyst the products may be separated into fractions unsuitable for further catalytic treatment, intermediate insufficiently converted fractions suitable for further contacting with the composite catalyst, and a gasoline boiling range fraction and gases, the intermediate fractions being returned directly to admixture with the charging stock or processed in separate passes so as to ultimately obtain the maximum utilization of the charging stock in producing the desired gasoline product. Although the above consists in the more conventional practice, it is also possible to suspend the composite catalyst in a stream of oil as a powder and treat the suspension under suitable conditions of temperature, pressure and contact time. The gaseous olefins appearing in the product and the hydrogen are susceptible to the conventional processes of polymerization and hydrogen concentration.

The application of the present invention to the processing of hydrocarbon fractions besides being characterized by the use of novel catalysts is also of importance because of the moderate operating conditions of temperature and pressure. Temperatures employed in contact with the catalysts may be within the range of 750–1250° F., more or less, and substantially atmospheric pressure or moderately superatmospheric pressures such as those up to a few hundred pounds per square inch may be used, usually pressures below 100 pounds per square inch are used, the pressure being in some measure also governed by flow conditions through the vaporizing and conversion zones and the subsequent separating, fractionating and collecting equipment.

The following specific example is given to illustrate the process of the invention, a method of catalyst preparation also being given. The process should not be considered as limited to this example or to the particular catalyst preparation, it being given merely as illustrative of the novelty and utility of the invention.

Catalyst prepared according to the present invention consisted approximately of one part of cyclization component and 4 parts of the cracking principle. The general procedure observed in preparing this catalyst was to precipitate a silicia alumina composite, add a cyclization catalyst in a finely-divided condition to a suspension of the silica-alumina composite to form an intimate admixture.

A commercial grade of sodium silicate was diluted approximately 10 times and dilute hydrochloric acid solution was gradually added while agitating until the solution was very slightly acid whereupon a hydrated silica gel was formed. This gel was washed and then slurried in a dilute aqueous solution of aluminum chloride of the desired concentration. Aluminum hydroxide was then precipitated in the presence of the suspended silica by the addition of ammonium hydroxide. The amount of silica gel and aluminum salt reacted was such as to give a composite of the following approximate composition: $100SiO_2:5Al_2O_3$. The cyclization part was prepared by precipitating vanadium hydroxide upon activated alumina granules from a vanadyl chloride solution and calcining the impregnated material. These components were in the approximate ratio of $100Al_2O_3$ to $7V_2O_5$. This material was finely powdered and slurried with the wet silica-alumina composite in the ratio of 1 to 4 parts respectively. The composite was freed from excess water, and dried at approximately 250° F. The dried material was water washed to remove soluble impurities and the purified powder was again dried, mixed with a small proportion of a lubricant and pilled to form pellets of approximately $\frac{1}{8}$ inch size. These pellets were calcined at a temperature of approximately 1200° F. for several hours.

Catalyst pellets from the above batch were disposed in a vertical cylindrical chamber and vapors of a Pennsylvania gas oil preheated to a temperature of 900° F. were directed downwardly through the catalytic material using an hourly liquid space velocity of approximately one. The gasoline and the gas were separated from the partially converted gas oil product by distillation and 25% by volume of charging stock of 79 octane number gasoline recovered. This gasoline had a higher aromatic hydrocarbon content than gasoline produced from the same charging stock in the presence of silica-alumina catalyst alone. Runs made using quartz chips in place of the catalyst when processing gas oil under similar conditions gave a yield of only 4% having considerably lower octane number.

We claim as our invention:

1. A process for producing low boiling aromatic hydrocarbons from hydrocarbon oils heavier than gasoline and containing aliphatics, which comprises subjecting the oil to a non-hydrogenating cracking and dehydrocyclization treatment in the presence of an oxide of an element from the left-hand column of group V of the periodic table admixed with a cracking catalyst comprising a major proportion of silica and a minor proportion of alumina.

2. A process as set forth in claim 1 where the oxide of the element from the left-hand column of group V of the periodic table is supported upon a relatively inert refractory material.

3. A process as set forth in claim 1 where the oxide of the element from the left-hand column of group V of the periodic table is supported upon activated alumina.

4. A process as set forth in claim 1 where the cracking catalyst is an acid treated clay.

5. A process as set forth in claim 1 where the cracking catalyst comprises a purified precipitated silica gel.

6. A process as set forth in claim 1 where the cracking catalyst is characterized by having been prepared from precipitated silica gel and precipitated hydrous alumina.

7. A process for converting high boiling hydrocarbons into substantial yields of gasoline of high antiknock value which comprises subjecting said hydrocarbons to a non-hydrogenating cracking and dehydrocyclization treatment at a temperature within the approximate range of 750–1250° F. and in the presence of a precipitated and washed silica gel which has been impregnated with precipitated alumina, said impregnated material having been further admixed with a supported oxide of an element from the left-hand column of group V of the periodic table.

8. A process for converting high boiling hydrocarbons into substantial yields of gasoline of high antiknock value which comprises subjecting said hydrocarbons to a non-hydrogenating cracking and dehydrocyclization treatment at a temperature within the approximate range of 750–1250° F. and in the presence of a precipitated and washed silica gel which has been impregnated with precipitated alumina, said impregnated material having been further admixed with an oxide of an element from the left-hand column of group V of the periodic table.

ARISTID V. GROSSE.
JACQUE C. MORRELL.